United States Patent [19]

Baer

[11] 4,077,049
[45] Feb. 28, 1978

[54] UNIVERSAL TELEVISION INTERFACE

[75] Inventor: Ralph H. Baer, Manchester, N.H.

[73] Assignee: Sanders Associates, Inc., Nashua, N.H.

[21] Appl. No.: 762,539

[22] Filed: Jan. 26, 1977

[51] Int. Cl.² ............................................. H04N 7/18
[52] U.S. Cl. ..................................................... 358/93
[58] Field of Search ................................. 358/93, 139; 340/324 AD

[56] References Cited

U.S. PATENT DOCUMENTS

| 2,956,116 | 10/1960 | Singelman | 358/139 |
| 3,027,420 | 3/1962 | Schaffer et al. | 358/139 |
| 3,728,480 | 4/1973 | Baer | 358/93 |

Primary Examiner—Richard Murray
Attorney, Agent, or Firm—Louis Etlinger; Richard I. Seligman

[57] ABSTRACT

Apparatus for generating horizontal and vertical synchronization signals in synchronism with synchronization signals generated from an on-going television program received by a user is provided by employing a capacitive or inductive coupling to extract the electric or magnetic field surrounding the horizontal output transformer and deflection yoke of a television receiver and shaping the output of the coupler to provide pulses at the horizontal synchronization rate of the received program. These pulses are further multiplied, divided and shaped to provide vertical synchronization pulses. The dividing circuits include means for temporarily changing the divisor to accomplish proper framing. Auxiliary presentations can be displayed in conjunction with programs normally received by synchronizing the auxiliary presentations with the received programs by employing the generated synchronization signals.

16 Claims, 4 Drawing Figures

UNIVERSAL TELEVISION INTERFACE

BACKGROUND OF THE INVENTION

Presently, television receivers are being manufactured which incorporate therein means for displaying pictorial content in addition to that which is received from a broadcast studio or through a closed circuit or CATV cable system or from a video playback unit. These auxiliary presentations include items such as channel number and time of day. Since the use of these auxiliary presentations is relatively new in the art, most television receivers do not have equipment built in to provide such presentations. Thus, there are more than one hundred million television receivers in the United States alone which cannot display these auxiliary presentations such as time of day, channel number and the like.

There is disclosed in U.S. Pat. No. 3,728,480 which issued on Apr. 17, 1973 apparatus for displaying additional information in conjunction with information originating from a cooperative station such as a broadcast station, closed circuit television system, or a CATV network. In this patent, horizontal and vertical synchronization signals are extracted from the television receiver by employing a device in front of the receiver and attached thereto by, for example, a suction cup. This device includes a pick-up coil which extracts the magnetic field from the horizontal detection circuits which operate in step with the received synchronization signals and a photocell which is used to pick up a sixty Hertz signal component provided by a white rectangle or stripe at the bottom of the cathode ray tube of the receiver which would be broadcast by the cooperative station. This method is not entirely satisfactory in that the inductive coupling of the horizontal signal from a coil located on the cathode ray tube face is relatively weak and the use of a photocell to generate a vertical synchronization signal necessitates that the cooperative station generate a white marker at the vertical synchronization rate. Furthermore, it requires that a portion of the television screen be obstructed.

U.S. Pat. No. 3,728,480 also discloses what is referred to as a crowbar modulation circuit for overlaying auxiliary information on top of the information generated by the cooperative station. However, practical application of the techniques were never commercially employed because of the difficulty of extracting the synchronization signals from the received programs.

SUMMARY OF THE INVENTION

Accordingly, it is an object of this invention to provide improved means for generating synchronization signals in synchronization with those of a program received by a television receiver without making connections to the internal circuitry of the television receiver other than those reached via the antenna terminals.

It is another object of this invention to provide means for generating synchronization signals in synchronism with those of a program received by a television receiver simply and without obstructing the screen of the receiver.

It is a further object of this invention to provide improved means for overlaying information on the screen of a television receiver in conjunction with information received from another TV r.f. transmission source.

It is yet another object to provide means for generating synchronism signals in synchronism with those of a program received by a television receiver without cooperation from the generator of such program.

Briefly, means for generating synchronization signals in synchronization with those of a program received by a television receiver are provided by a capacitive coupler which is preferably positioned at the back or one side of a television receiver to pick up the electric field surrounding the horizontal output transformer and deflection yoke of the receiver. The output of the capacitive coupler is appropriately shaped to provide horizontal synchronization pulses of desired form.

These generated horizontal synchronization pulses are multiplied by a factor of two and divided by five hundred and twenty five to provide synchronization pulses at the vertical synchronization pulse rate. Since the chances are slight that these generated vertical synchronization pulses will be in synchronization with the vertical synchronization pulses generated by the program generating TV r.f. signal transmission source the divisor of the divider circuit is momentarily changed to some number other than five hundred and twenty five while viewing the auxiliary information displayed on the television screen to see that it is properly framed and when so, the divisor is returned to five hundred and twenty five.

Auxiliary presentations superimposed on an ongoing television program are provided in synchronism with the received presentation by employing the generated synchronization signals, and using a crowbar r.f. modulating technique to impress the new video information on to the transmitted, modulated r.f. (TV) carrier signal.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
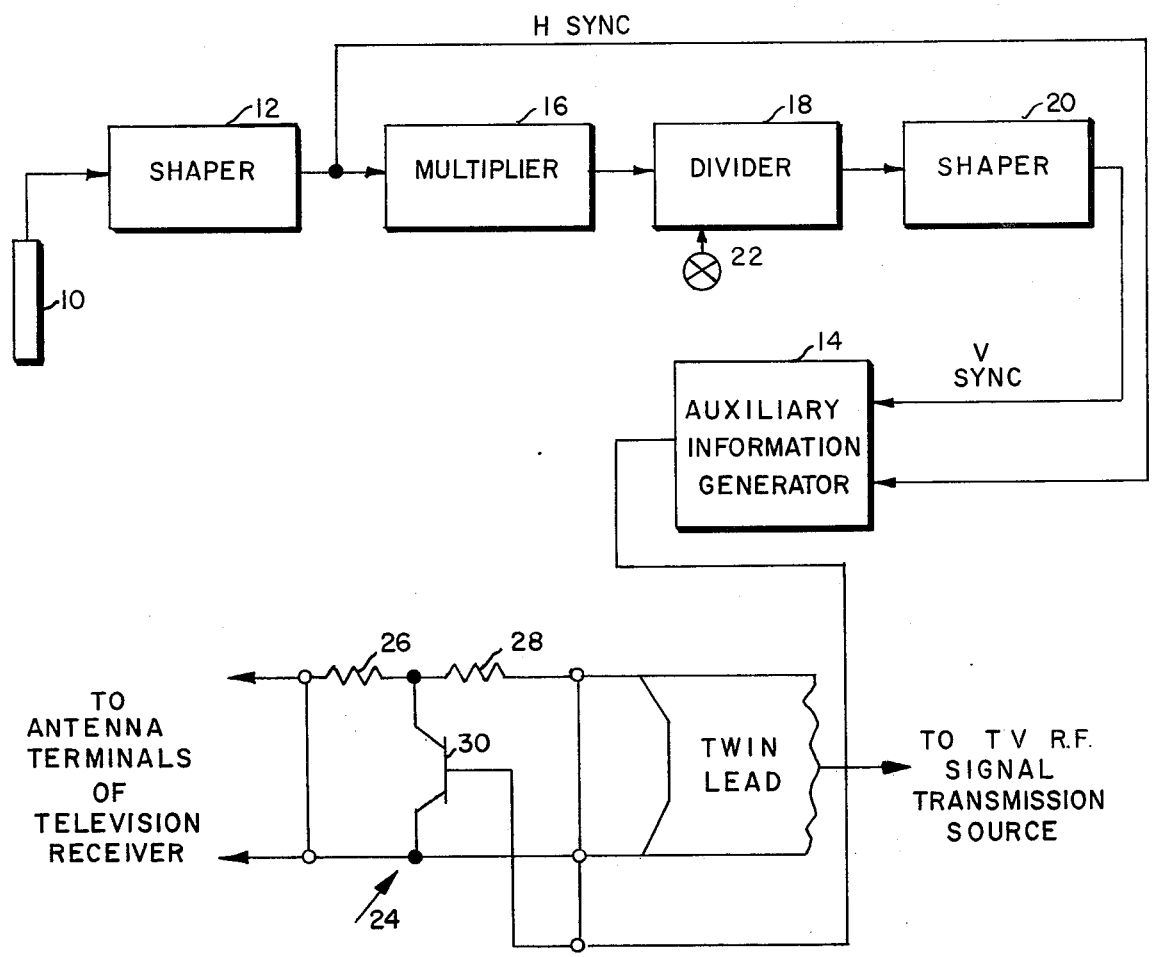
FIG. 1 is a block diagram of a universal television interface.

Referring now to FIG. 1 of the drawings, there is illustrated thereby a preferred embodiment of the invention. Horizontal synchronization signals received by a television receiver from a TV r.f. signal transmission source (such as a broadcast station, closed circuit system, CATV network or video playback unit) are extracted employing a probe 10 which is positioned adjacent the televison receiver. In one embodiment probe 10 is a capacitive coupler and is placed adjacent one side or the rear of the television receiver proximate the horizontal output transformer and deflection yoke thereof. Capacitive probe 10 comprises a rectangular conductive plate on the order of four inches by six inches. The dimension of the plate, however, is not critical for this application. A length of wire may be used instead. A six inch piece suffices. However, in this case also size is not critical. The output of capacitor probe 10 will be a train of pulses essentially in step with the horizontal synchronization signal received by the television receiver. Alternatively, probe 10 can be an inductive pickup coil located near the back or sides of the television receiver.

The output of the capacitor probe 10 is applied to a shaping circuit 12 to provide pulses of desired configuration. In one embodiment shaper 12 comprises an emitter follower and a monostable multivibrator. The outputs of shaper 12 are the regenerated horizontal synchronization pulses. These are applied to an auxiliary information generator 14 for generating the auxiliary presentation which is to be displayed on the cathode ray tube of a television receiver in conjunction with the information received otherwise by the receiver through the air from a broadcast station or through a cable from a CATV or closed circuit cooperative station or a video playback unit.

Rather than provide additional means to extract vertical synchronization signals as provided in U.S. Pat. No. 3,728,480, which would necessitate obstructing some portion of the front of the television receiver as well as require cooperation from the cooperative station, vertical synchronization signals are generated from the extracted horizontal synchronization signals. In the embodiment of FIG. 1, the horizontal synchronization pulses from shaper 12 are applied to a multiplier 16 and its output to a divider 18. Multiplier 16 multiplies the signal applied thereto by a factor of two and divider 18 divides the signal from multiplier 16 by a factor of five hundred and twenty five. The reason for multiplying and then dividing the horizontal synchronization pulses rather than merely dividing is to achieve simpler operation as it is easier for digital circuits to multiply by two and divide by five hundred and twenty five rather than divide by two hundred sixty two and one half. However, the alternate approach would be acceptable. The output of divider 18 is applied to a shaper 20 to obtain pulses of desired configuration and the output from the shaper is applied to auxiliary information generator 14.

Divider circuit 18 also has associated therewith a framing control 22. This is employed in order to properly frame the auxiliary presentation from auxiliary information generator 14 displayed on the television receiver. This is necessary since the vertical synchronization pulses were merely generated by counting down from the horizontal synchronization pulses and may not be in synchronization with the vertical synchronization pulses received from a cooperative station. The chances of the vertical synchronization pulses generated in this fashion being in synchronization with the pulses received from a TV r.f. signal transmission source would be only one in five hundred and twenty five. Accordingly, the framing control adjusts the divisor of circuit 18 by some amount to cause the auxiliary presentation to roll up or down as the case may be. This is accomplished by changing the divisor of divider circuit 18 from 525 to 524 or 526, respectively. Once properly framed as observed by the viewer, the divisor is returned to 525 and the auxiliary presentation displayed will remain properly framed.

A crowbar modulator 24 is employed to display the information from auxiliary information generator 14 on a portion of the television receiver in place of the normal displayed information received from a cooperative station. This circuit is disclosed in detail in the aforementioned U.S. Pat. No. 3,728,480 and comprises an attenuator consisting of two series resistors 26 and 28 and a transistor 30 acting as a variable shunt resistor. Biasing this transistor sufficiently into conduction by applying modulation to its base from the auxiliary information generator 14 saturates the transistor momentarily reducing the r.f. signal going from the cooperative station to the TV receiver antenna terminals. This corresponds to carrier reduction, which is negative modulation and is equivalent to generating a video signal going from black to white and back to the black level.

In another embodiment of the invention which is useful in color TV applications, the vertical synchronization signal instead of being generated from the extracted horizontal synchronization signals is instead generated from the 60 Hertz power line in conventional fashion. This results in a gracefully vertically precessing display very useful for clocks, etc., the precessing rate being the difference between the power line frequency (60 Hertz) and the vertical synchronization rate for broadcast color television signals which is not 60 Hertz but rather on the order of 59.94 Hertz.

Figure 2:
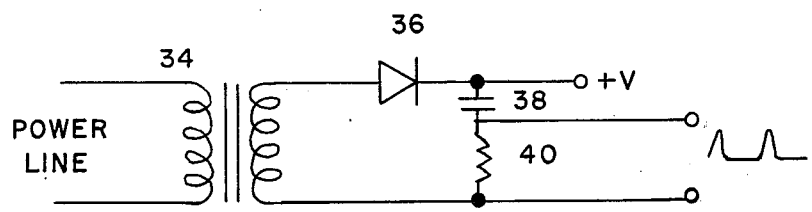
FIG. 2 is a schematic of a circuit providing an alternative method of generating vertical synchronization signals from that shown in the embodiment of FIG. 1.

A typical circuit for accomplishing this is shown in FIG. 2 wherein the input 60 Hertz signal from a power line is applied to the primary of a transformer 34. The output of the transformer is applied to a diode 36 and through a capacitor 38 and a resistor 40 to ground. The junction of diode 36 and capacitor 38 is coupled to a d.c. power source and the output of the circuit is taken across resistor 40.

Figure 3A:
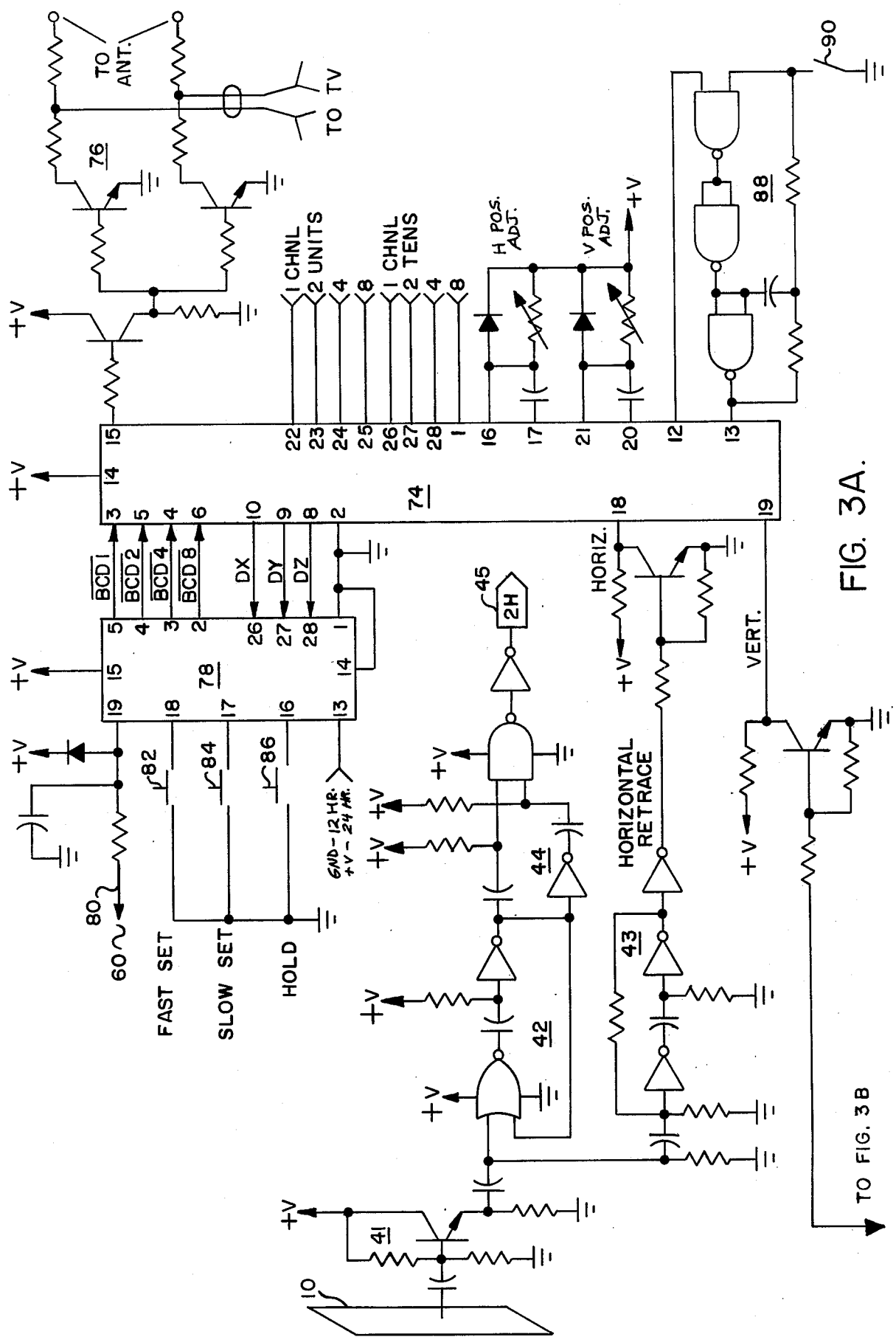
FIGS. 3A and 3B are schematics of one embodiment of the apparatus for displaying an auxiliary presentation on a television receiver.
Figure 3B:
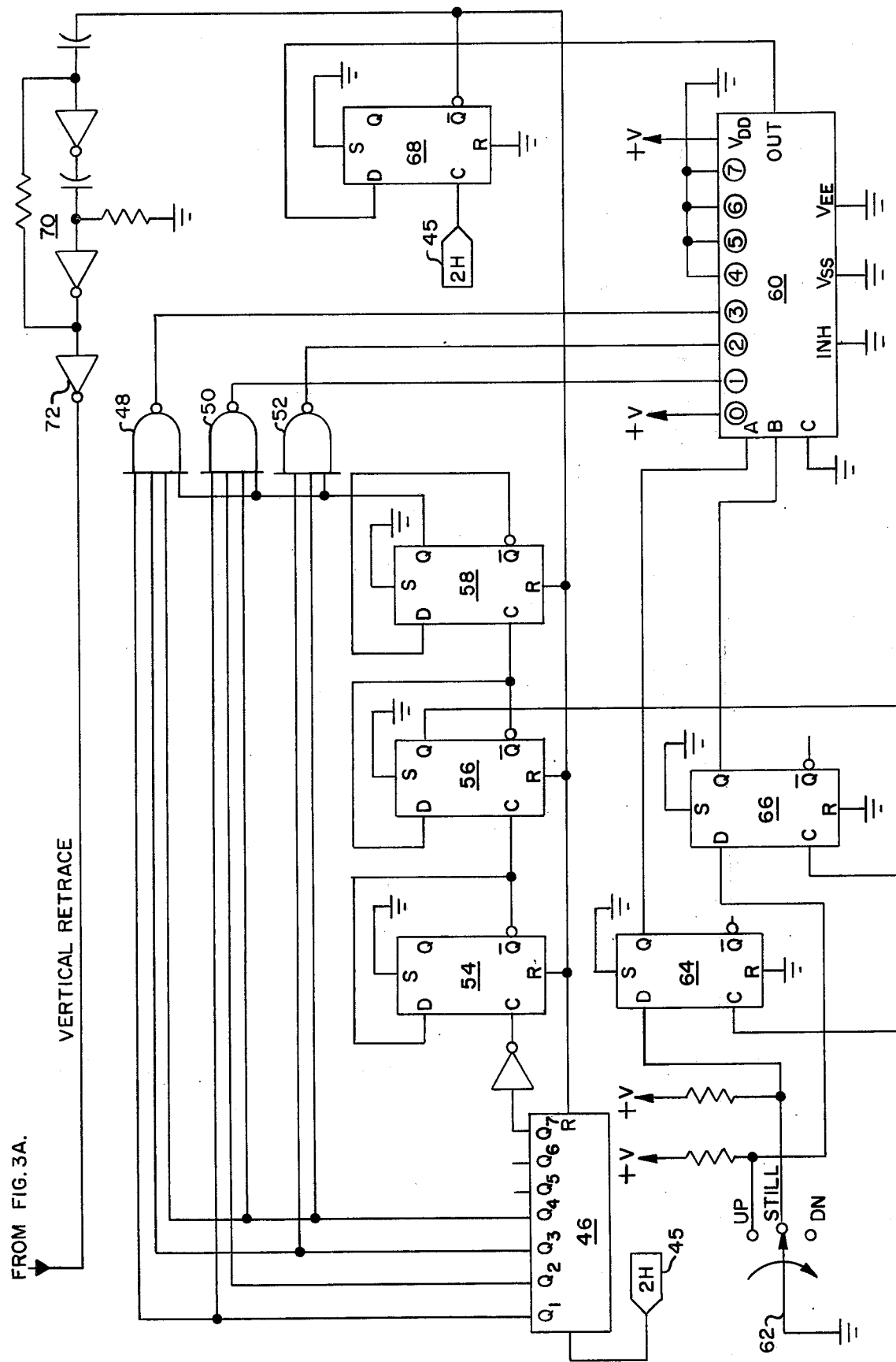

One detailed circuit implementation for generating and displaying an auxiliary presentation in accordance with the teachings of FIG. 1 is shown in FIG. 3. Probe 10 couples from the television receiver the horizontal synchronization signal received by the television receiver from a TV r.f. signal transmission source via an amplifier 41. The output from amplifier 41 is applied to a shaping circuit 43 to generate horizontal synchronization pulses in synchronization with the synchronization signals generated by the cooperative station. In this embodiment shaping circuit 43 is a monostable multivibrator. The output of probe 10 is also applied to a monostable multivibrator 42 with the output therefrom applied to a doubler 44 to generate a 2H signal 45.

The 2H signal 45 is applied to a divide by 10 counter comprising a seven bit binary counter 46, which in one embodiment is a RCA No. CD4024A, and three flip-flops 54, 56, 58. The outputs of binary counter 46 and flip-flops 54, 56 and 58 are applied to a series of NAND gates 48, 50 and 52. These gates detect whether divide by 10 counter has made 525 counts, 524 counts or 526 counts, respectively. The outputs of NAND gates 48, 50 and 52 are applied to selective inputs of a multiplexer 60 which, in one embodiment, comprises a RCA CD4051B. Multiplexer 60 selects which of the NAND gates is to be outputted.

A switch 62 is used to make this selection, that is, change the divisor of the divider circuit, represented in the diagram of FIG. 1 as switch 22 of divider 18, to change the count therein to either 526 to make the auxiliary display precess up or to 524 to make the auxiliary display precess down. The output of the switch is coupled to a pair of flip-flops 64 and 66 with the outputs therefrom applied as additional inputs to multiplexer 60. The output from multiplexer 60 is applied to another flip-flop 68 along with the 2H signal 45. The $\bar{Q}$ output of flip-flop 68 is applied to a monostable multivibrator 70 and its output applied to an inverter 72, thus providing the vertical synchronization signal. This $\bar{Q}$ output also resets the divide by ten counter.

The generated H and V signals are applied to circuits comprising the auxiliary information generator. In this embodiment where the auxiliary presentation is the time of day, a National Semiconductor MM5841 integrated circuit 74 is used and the H and V signals are applied thereto along at pins 18 and 19. The output of circuit 74 is applied to a crowbar modulator 76 and the output therefrom to the antenna terminals of a television receiver. Crowbar modulator 76 differs from crowbar modulator 24 of FIG. 1 in that both sides of the line are crowbarred.

A clock (count down chain) 78, as for example, a National Semiconductor MM5318 is employed to feed time into circuit 74. Clock 78 requires a 60 Hertz input 80 thereto. Three switches 82, 84 and 86 are used to set clock 78.

The clock input for circuit 74 is provided by an oscillator 88 which is disabled by a switch 90 to shut off the auxiliary presentation.

When the equipment is connected as shown in FIG. 3, the time of day would be displayed on the screen of the television receiver and it would be displayed thereon either still or precessing up or down. If it was still, then it is known that the vertical synchronization signal is in synchronization with the vertical synchronization signals received at the receiver from the TV r.f. signal transmission source. On the other hand, if the time of day is precessing down, the switch 62 would be turned to the up position thereof to cause it to precess up. The switch would then be switched back to the "still" position to cause the time of day to be permanently in a still position. The opposite procedure, of course, is accomplished if the time of day was precessing upwards.

Although the present invention has been disclosed in conjunction with putting up, for example, the time of day on a television receiver in conjunction with a program received from a TV r.f. signal transmission source, it is obvious that it could be used for putting any information such as alphanumerics and graphics in addition to that received from a TV r.f. signal transmission source. Thus, it is to be understood that the embodiments shown are to be regarded as illustrative only, and that many variations and modifications may be made without departing from the principles of the invention herein disclosed and defined by the appended claims.

I claim:

1. Apparatus for generating synchronization signals from an ongoing program received at a television receiver from a TV r.f. signal transmission source, comprising:

means adapted to be positioned proximate a television receiver for extracting a signal in synchronism with the horizontal synchronization signal received by the television receiver from the TV r.f. signal transmission source;

means electrically coupled to said extracting means for generating a signal at the vertical synchronization rate, including means for dividing the extracted signal by a predetermined number; and means for changing the divisor of said dividing means.

2. Apparatus as defined in claim 1, wherein said predetermined number is two hundred-sixty two and one half.

3. Apparatus as defined in claim 2 wherein said dividing means includes means for multiplying the extracted signal by a factor of two and means coupled to said multiplying means for dividing the two times signal by five hundred and twenty five.

4. Apparatus as defined in claim 2, further including means coupled to said dividing means for shaping the output therefrom.

5. Apparatus as defined in claim 1, wherein said extracting means includes a capacitive coupler.

6. Apparatus as defined in claim 5, wherein said capacitive coupler includes a conductive plate.

7. Apparatus as defined in claim 5, wherein said capacitive coupler includes a length of conductive wire.

8. Apparatus as defined in claim 1, wherein said extracting means includes an inductive coupler.

9. Apparatus as defined in claim 8, wherein said inductive coupler includes a core of magnetic-flux enhancing material.

10. Apparatus for overlaying an auxiliary presentation on an ongoing program received by a television receiver from a TV r.f. signal transmission source, comprising:

means adapted to be positioned proximate a television receiver for extracting a signal in synchronism with the horizontal synchronization signal received by the television receiver from a TV r.f. signal transmission source;

means electrically coupled to said extracting means for generating a signal at the vertical synchronization rate;

means for generating an auxiliary presentation coupled to said signal extracting means and to said means for generating a signal at the vertical synchronization rate; and means for framing the auxiliary presentation on the screen of a television receiver including means for temporarily changing the rate of the signal generated to one other than the vertical synchronization rate.

11. Apparatus as defined in claim 10, further including means for coupling the output of said auxiliary presentation generating means to a television receiver.

12. Apparatus for overlaying an auxiliary presentation on an ongoing program received by a television receiver from TV r.f. signal transmission source, comprising:

means adapted to be positioned proximate a television receiver for extracting a signal in synchronism with the horizontal synchronization signal received by the television receiver from a TV r.f. signal transmission source;

means coupled to a power line for generating a sixty Hertz signal simulating a vertical synchronization signal at a rate slightly different from the actual vertical synchronization signal rate of the ongoing program; and means for generating an auxiliary presentation coupled to said signal extracting means and to said means for generating a sixty Hertz signal.

13. Apparatus as defined in claim 12, further including means for coupling the output of said auxiliary presentation generating means to a television receiver.

14. Apparatus for generating synchronization signals from an ongoing program received at a television receiver from a TV r.f. signal transmission source, comprising:

means adapted to be positioned proximate a television receiver for extracting a signal in synchronism with the horizontal synchronization signal received by the television receiver from the TV r.f. signal transmission source;

means coupled to said extracting means for shaping the extracted signal; and means electrically coupled to said shaping means for generating a signal at the vertical synchronization rate.

15. Apparatus for generating synchronization signals from an ongoing program received at a television receiver from a TV r.f. signal transmission source, comprising:

a capacitive pickup adapted to be positioned proximate and external to a television receiver for extracting a signal in synchronism with the horizontal synchronization signal received by the television receiver from the TV r.f. signal transmission source; and means electrically coupled to said capacitive pickup for generating a signal at the vertical synchronization rate.

16. Apparatus for overlaying an auxiliary presentation on an ongoing program received by a television receiver from a TV r.f. signal transmission source, comprising:

a capacitive pickup adapted to be positioned proximate and external to a television receiver for extracting a signal in synchronism with the horizontal synchronization signal received by the television receiver from a TV r.f. signal transmission source;

means electrically coupled to said capacitive pickup for generating a signal at the vertical synchronization rate; and means for generating an auxiliary presentation coupled to said capacitive pickup and to said means for generating a signal at the vertical synchronization rate.

* * * * *